(12) United States Patent
Brady et al.

(10) Patent No.: US 7,632,340 B2
(45) Date of Patent: Dec. 15, 2009

(54) AIR PURIFIER FOR REMOVING PARTICLES OR CONTAMINANTS FROM AIR

(75) Inventors: Martin Patrick Brady, Richmond, VA (US); Mark Francis Turner, Mechanicsville, VA (US); Cuong Truong, Richmond, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 154 days.

(21) Appl. No.: 11/683,227

(22) Filed: Mar. 7, 2007

(65) Prior Publication Data

US 2008/0216657 A1    Sep. 11, 2008

(51) Int. Cl.
  *B01D 46/46*    (2006.01)
(52) U.S. Cl. ............................ 96/26; 96/417; 96/418; 55/471; 55/472
(58) Field of Classification Search ............... 55/385.1, 55/471, 472; 422/186.04; 96/417, 418, 26
See application file for complete search history.

(56) References Cited

U.S. PATENT DOCUMENTS

| | | | |
|---|---|---|---|
| 991,572 | A | 5/1911 | Weisenstein |
| 1,614,817 | A | 1/1927 | Andrew |
| 2,016,033 | A | 10/1935 | Christofferson |
| 2,667,301 | A | 1/1954 | Lautner |
| 2,788,085 | A | 4/1957 | Waller |
| 2,855,641 | A | 10/1958 | Stein |
| 2,945,554 | A | 7/1960 | Berly |
| D195,464 | S | 6/1963 | Foster et al. |
| 3,235,325 | A | 2/1966 | Storchheim |
| 3,606,998 | A | 9/1971 | LaPorte et al. |
| 3,654,747 | A | 4/1972 | Remick |
| 3,967,927 | A | 7/1976 | Patterson |
| D254,566 | S | 3/1980 | Cummins |
| 4,244,710 | A | 1/1981 | Burger |
| 4,252,547 | A | 2/1981 | Johnson |
| 4,778,496 | A | 10/1988 | Conrad |
| 5,035,728 | A * | 7/1991 | Fang .............................. 96/19 |
| 5,217,696 | A | 6/1993 | Wolverton et al. |
| RE34,334 | E | 8/1993 | Chaney |
| 5,269,824 | A | 12/1993 | Takita |
| 5,407,469 | A * | 4/1995 | Sun ............................... 96/62 |
| D361,374 | S | 8/1995 | Muller |
| D366,695 | S | 1/1996 | Berazaluce |
| D386,255 | S | 11/1997 | Ying-teng |

(Continued)

*Primary Examiner*—Duane Smith
*Assistant Examiner*—Sonji Turner
(74) *Attorney, Agent, or Firm*—Panitch Schwarze Belisario & Nadel LLP

(57) ABSTRACT

An air purifier includes a housing having an air inlet, an air outlet and an airflow path therethrough. The housing has a top, a bottom and a plurality of sides. An air filter is located within the housing in the airflow path and a motor is located within the housing. The motor includes a motor shaft and a fan is on the motor shaft for urging air into the air inlet, through the airflow path and out of the air outlet. A cover is removably mounted to the housing proximate the air inlet and a base is removably mounted to the housing. The air purifier is positionable in one of a vertical operating orientation when the weight of the housing is supported by the base and a horizontal operating orientation when the weight of the housing is supported by one of the sides of the housing.

16 Claims, 8 Drawing Sheets

U.S. PATENT DOCUMENTS

| | | |
|---|---|---|
| D388,510 S | 12/1997 | Rick et al. |
| D389,567 S | 1/1998 | Gudefin |
| 5,738,700 A * | 4/1998 | King ........................ 55/385.3 |
| 5,762,667 A | 6/1998 | Pippel |
| D420,438 S | 2/2000 | Pinchuk |
| 6,053,968 A | 4/2000 | Miller |
| D440,292 S | 4/2001 | Kip |
| 6,245,120 B1 | 6/2001 | Stanek |
| 6,344,065 B1 | 2/2002 | Boulva |
| D462,754 S | 9/2002 | Briggs et al. |
| 6,494,940 B1 * | 12/2002 | Hak ........................... 96/224 |
| 6,676,505 B2 | 1/2004 | Behl |
| 6,716,265 B2 | 4/2004 | Hung et al. |
| D489,800 S | 5/2004 | Tokunaga |
| 6,752,970 B2 | 6/2004 | Schwartz et al. |
| 6,783,578 B2 | 8/2004 | Tillman, Jr. |
| 6,790,251 B1 * | 9/2004 | Brady, Jr. ..................... 55/419 |
| D498,296 S | 11/2004 | Shimizu |
| D503,972 S * | 4/2005 | Pippel et al. ................ D23/355 |
| 6,926,762 B2 * | 8/2005 | Kim et al. .................... 96/397 |
| 6,929,684 B2 * | 8/2005 | Chang et al. ................. 96/226 |
| 6,945,868 B2 | 9/2005 | Gautney |
| 6,949,228 B2 | 9/2005 | Yang et al. |
| 6,962,619 B1 * | 11/2005 | DeRosa et al. ................ 95/267 |
| 7,014,686 B2 * | 3/2006 | Gatchell et al. ................ 96/51 |
| 7,040,101 B2 | 5/2006 | Takeda et al. |
| 7,309,386 B2 * | 12/2007 | Wu et al. ....................... 96/70 |
| 7,364,605 B2 * | 4/2008 | Yuen ............................. 96/16 |
| 2003/0003028 A1 | 1/2003 | Tomaselli |
| 2003/0012703 A1 | 1/2003 | Lee |
| 2003/0070544 A1 * | 4/2003 | Mulvaney et al. .............. 95/25 |
| 2004/0258577 A1 | 12/2004 | Chen |
| 2005/0016378 A1 | 1/2005 | Yuen |
| 2005/0158219 A1 | 7/2005 | Taylor et al. |
| 2005/0163669 A1 | 7/2005 | Taylor et al. |
| 2005/0175512 A1 | 8/2005 | Yuen |
| 2006/0034737 A1 | 2/2006 | Beam et al. |
| 2006/0078476 A1 | 4/2006 | Yuen |
| 2006/0152946 A1 | 7/2006 | Chien |
| 2006/0159594 A1 | 7/2006 | Parker et al. |
| 2007/0012192 A1 * | 1/2007 | Pippel et al. .................. 96/417 |
| 2007/0221061 A1 * | 9/2007 | Steiner et al. .................. 96/63 |

* cited by examiner

AIR PURIFIER FOR REMOVING PARTICLES OR CONTAMINANTS FROM AIR

BACKGROUND OF THE INVENTION

The present application is directed to an air purifier for removing particles or contaminants from air. The air purifier preferably removes dust and other particles from a room, typically in a household environment. More particularly, the present application is directed to an air purifier that allows a user to change the orientation of the air purifier depending on the desired location of the air purifier and that provides for a predetermined center of gravity that reduces the likelihood that the air purifier will tip over.

As room air and the atmosphere in general becomes contaminated, dusty or otherwise dirtied, the general population becomes aware of discomforts and other disadvantages associated with contaminated air. Air purification and/or filtration devices of various shapes, sizes and capacities have become popular as a result of the increased awareness of household air quality and air quality in general. Various air purifiers or air filtration devices are available for home or industrial use. However, such air purifiers typically only operate in one orientation, which limits a user's ability to place the air purifier in a desired location.

It would be desirable to construct an air purifier that removes particles or contaminants, including dust, from air and is capable of operating in more than one orientation to allow a user to place the air purifier in a variety of locations. Furthermore, it would also be desirable to construct an air purifier that has a predetermined center of gravity such that the air purifier is less likely to tip over particularly when in a vertical operating orientation.

BRIEF SUMMARY OF THE INVENTION

Briefly stated, a preferred embodiment of the present invention is directed to an air purifier for removing particles or contaminants from air. The air purifier includes a housing having an air inlet, an air outlet and an airflow path therethrough. Further, the housing has a top, a bottom and a plurality of sides. An air filter is located within the housing in the airflow path and a motor is also located within the housing. The motor includes a motor shaft and a fan is on the motor shaft for urging air into the air inlet, through the airflow path and out of the air outlet. A cover is removably mounted to the housing proximate the air inlet and a base is removably mounted to the housing. The air purifier is positionable in one of a vertical operating orientation when the weight of the housing is supported by the base and a horizontal operating orientation when the weight of the housing is supported by one of the sides of the housing.

In another aspect, a preferred embodiment of the present application is directed to an air purifier, positionable in one of a vertical operating orientation and a horizontal operating orientation, for removing particles from air. A housing includes an air inlet, an air outlet and an airflow path therethrough. Further, the housing has a height and a midpoint disposed midway along the height. An air filter is removably mounted within the housing in the airflow path and a motor is mounted within the housing. The motor includes a motor shaft and a fan is on the motor shaft for urging air into the air inlet, through the airflow path and out of the air outlet. The motor is located between the midpoint and a bottom of the housing when the housing is in the vertical operating orientation. A cover, including an air cowl, is removably mounted to the housing proximate the air inlet.

In another aspect, a preferred embodiment of the present application is directed to an air purifier for removing particles or contaminants from air. The air purifier includes a housing having an air inlet, an air outlet and an airflow path therethrough. Further, the housing has a top, a bottom, a plurality of sides and at least one light source on a front surface of the housing. An air filter is located within the housing in the airflow path. A cover is removably mounted to the housing proximate the air inlet. The at least one light emitting structure illuminates the air inlet when the air purifier is turned on to provide a glowing effect to the air inlet.

BRIEF DESCRIPTION OF THE SEVERAL VIEWS OF THE DRAWINGS

The foregoing summary, as well as the following detailed description of a preferred embodiment of the present invention, will be better understood when read in conjunction with the appended drawings. For the purpose of illustrating the invention described in the present application, there is shown in the drawings, an embodiment which is presently preferred. It should be understood, however, that the invention is not limited to the precise arrangements and instrumentalities shown. In the drawings.

DETAILED DESCRIPTION OF THE INVENTION

Figure 1:
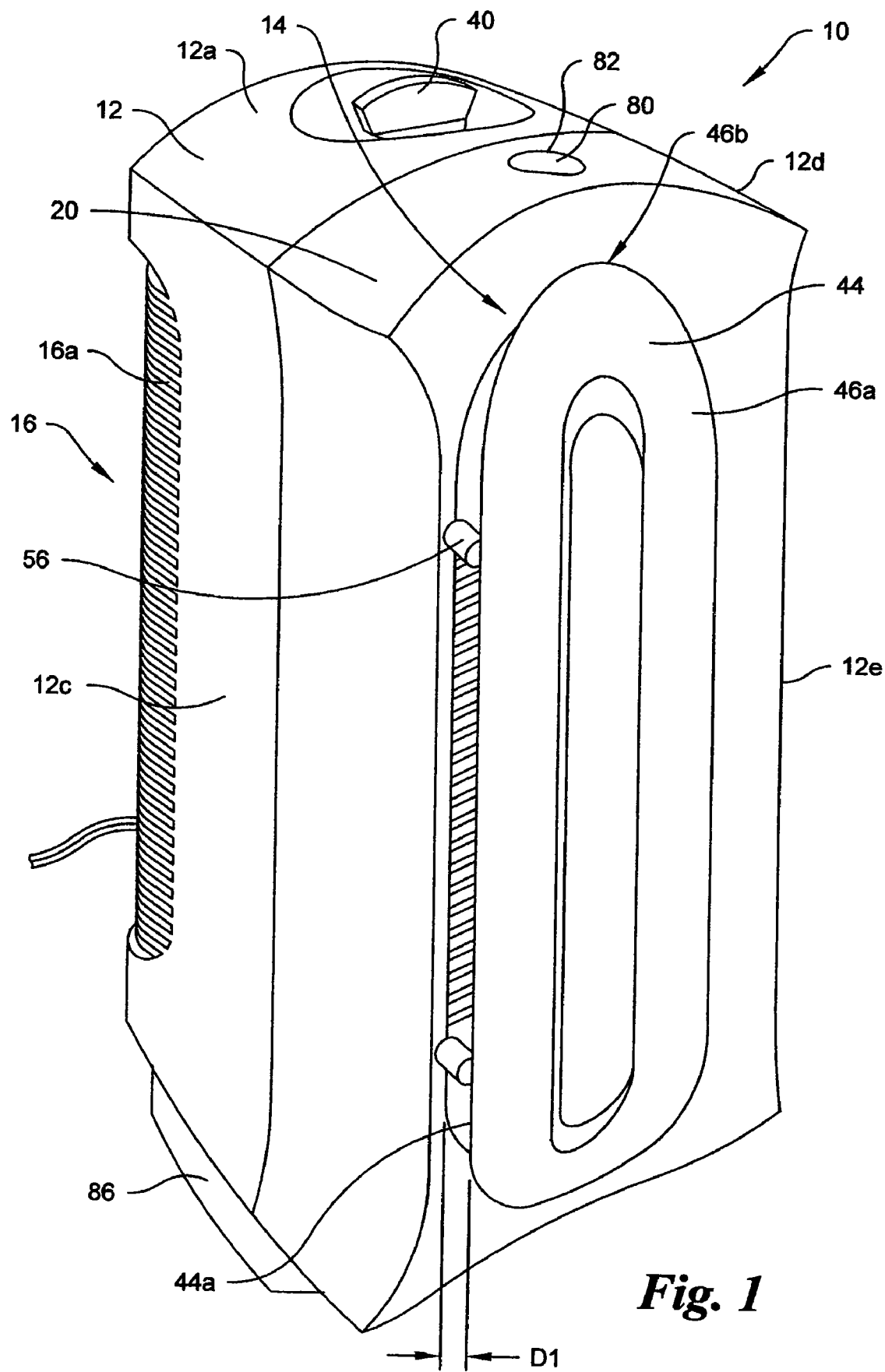
FIG. 1 is a top left perspective view of a preferred embodiment of an air purifier of the present invention in a vertical operating orientation.

Certain terminology is used in the following description for convenience only and is not limiting. The words "right", "left", "lower" and "upper" designate directions in the drawings to which reference is made. The words "inwardly" and "outwardly" refer to directions toward and away from, respectively, the geometric center of the air purifier and designated parts thereof. The terminology includes the above-listed words, derivatives thereof and words of similar import.

Referring to the drawings wherein like numerals indicate like elements throughout, there is shown in FIGS. 1-7 a preferred embodiment of an air purifier, generally designated 10, for removing particles or contaminants from air that allows a user to change the orientation of the air purifier 10 depending on the desired location of the air purifier 10 and has a predetermined center of gravity that reduces the likelihood that the air purifier 10 will tip over. Specifically, the air purifier 10 is positionable in one of a vertical operating orientation (FIG. 1) when the weight of the air purifier 10 is supported by a removable base 86 and a horizontal operating orientation (FIG. 2) when the weight of the housing is supported by either one of the sides 12c, 12d of the housing 12.

Figure 2:
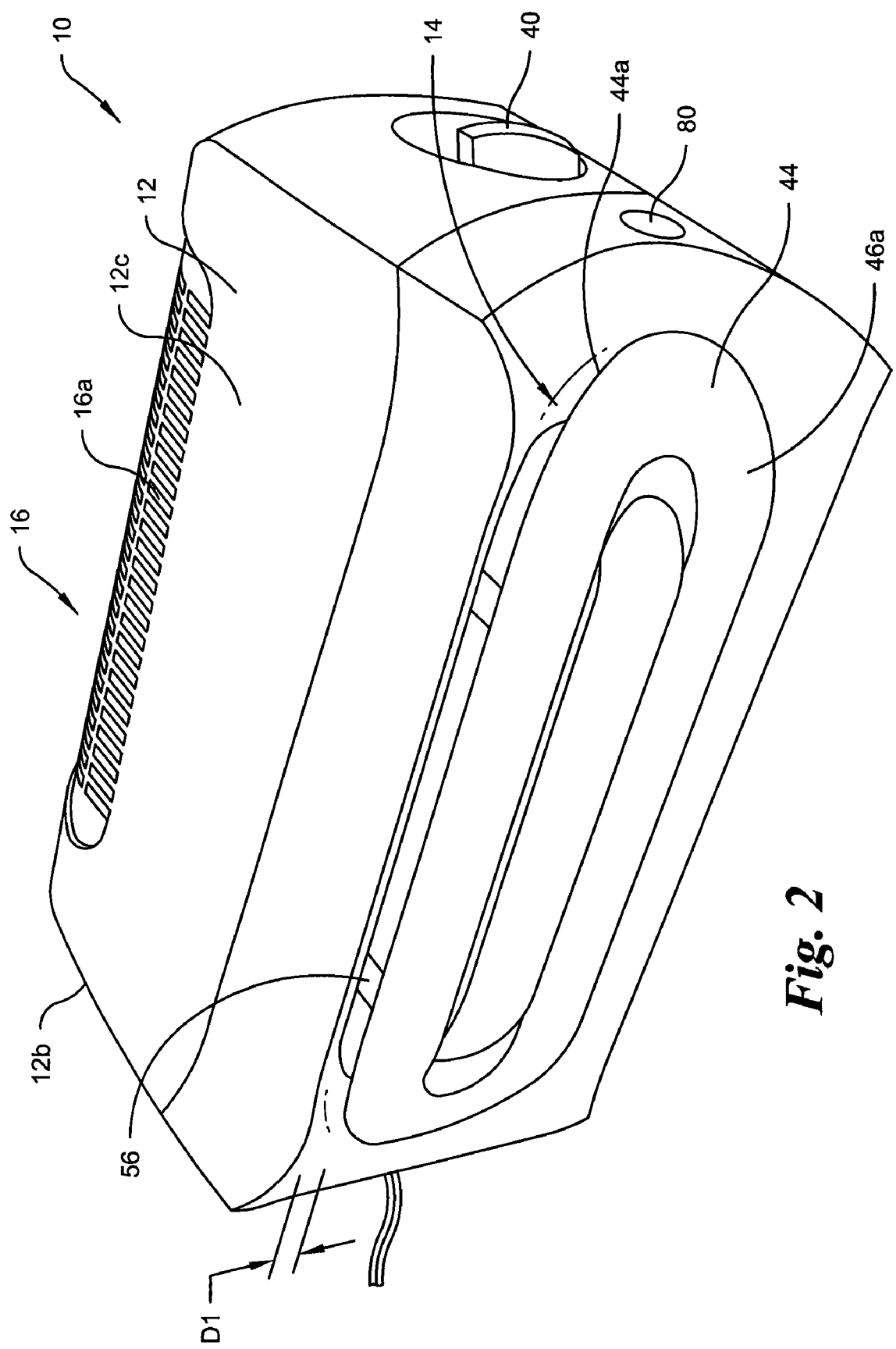
FIG. 2 is a top right perspective, of the air purifier shown in FIG. 1 in an horizontal operating orientation.
Figure 5:
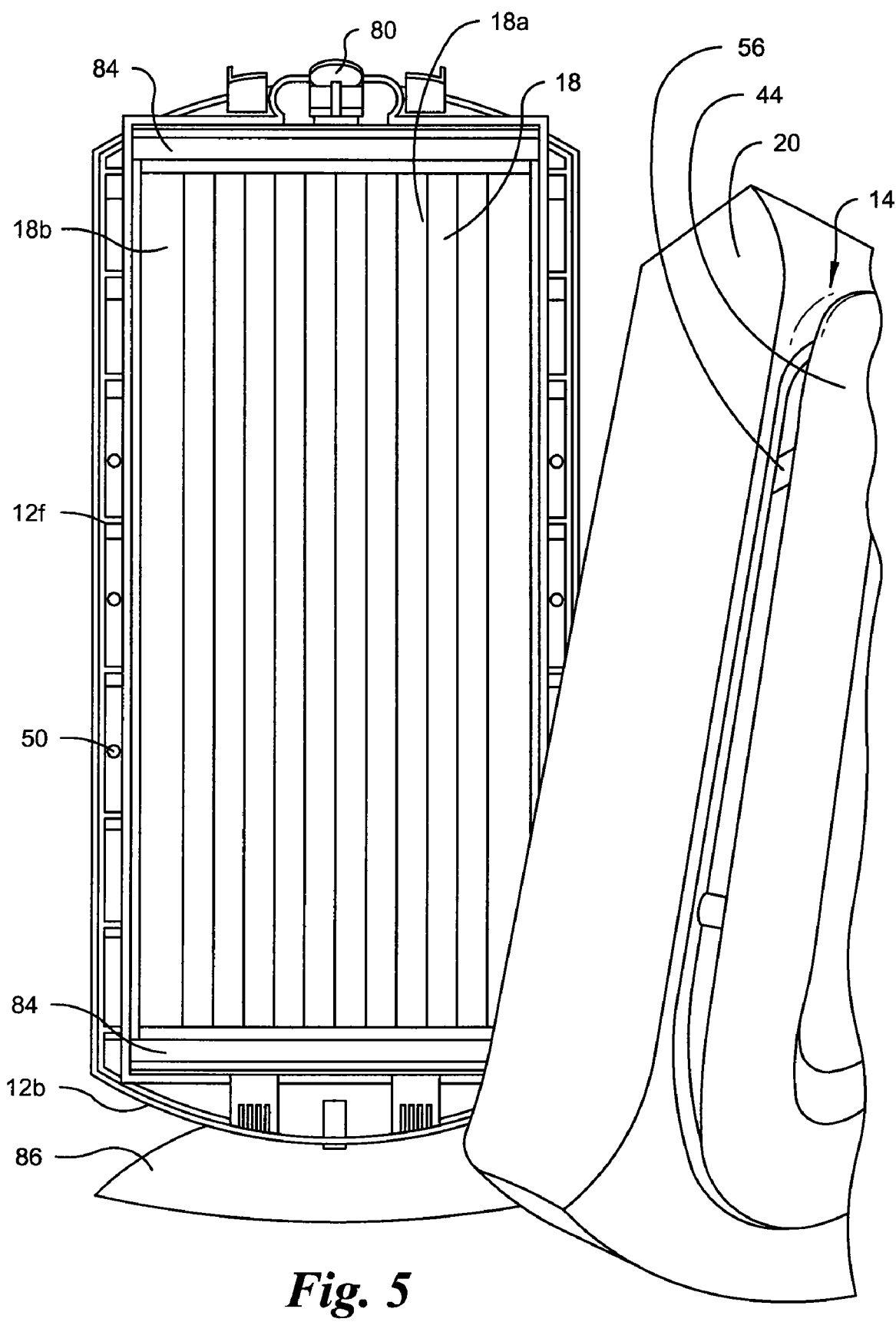
FIG. 5 is front elevation view of the housing of the air purifier shown in FIG. 1 with the cover partially removed for clarity.

Referring to FIGS. 1-2 and 5, the air purifier 10 includes a housing 12 having a top 12a, a bottom 12b, a left side 12c and a right side 12d. Further, the housing 12 has an air inlet 14, an air outlet 16 and an airflow path through the housing 12 between the air inlet 14 and the air outlet 16. In the preferred embodiment, the housing 12 is constructed of a molded, generally rigid polymeric material that is generally hollow between the air inlet 14 and the air outlet 16 to form the airflow path therethrough. The housing 12 is not limited to being constructed of generally rigid, molded polymeric materials and may be constructed of nearly any material that is able to take on the general shape of the housing 12 and withstand the normal operating conditions of the housing 12. For example, the housing 12 may be constructed of a formed sheet metal, assembled wooden or machined metal or any other suitable material.

In the preferred embodiment, the air outlet 16 is comprised of a louvered vent 16a integrally molded into at least one side surface 12c, 12d of the housing 12. The louvers of the louvered vent 16a permits airflow through the air outlet 16 and generally prevent insertion of objects or appendages of a user's body into the outlet 16 and potentially into contact with moving parts of the air purifier 10 within the housing 12. The air purifier 10 is not limited to including the louvered vent 16a to form the air outlet 16. The air outlet 16 may be comprised of nearly any penetration, hole or air permeable surface on the housing 12 that permits airflow out of the housing 12 from the airflow path. For example, the air outlet 16 may be comprised of a hole in the housing 12, the hole being covered by an air permeable sheet or a plurality of holes in the housing 12 that permit flow of air out of the housing 12.

Figure 6A:
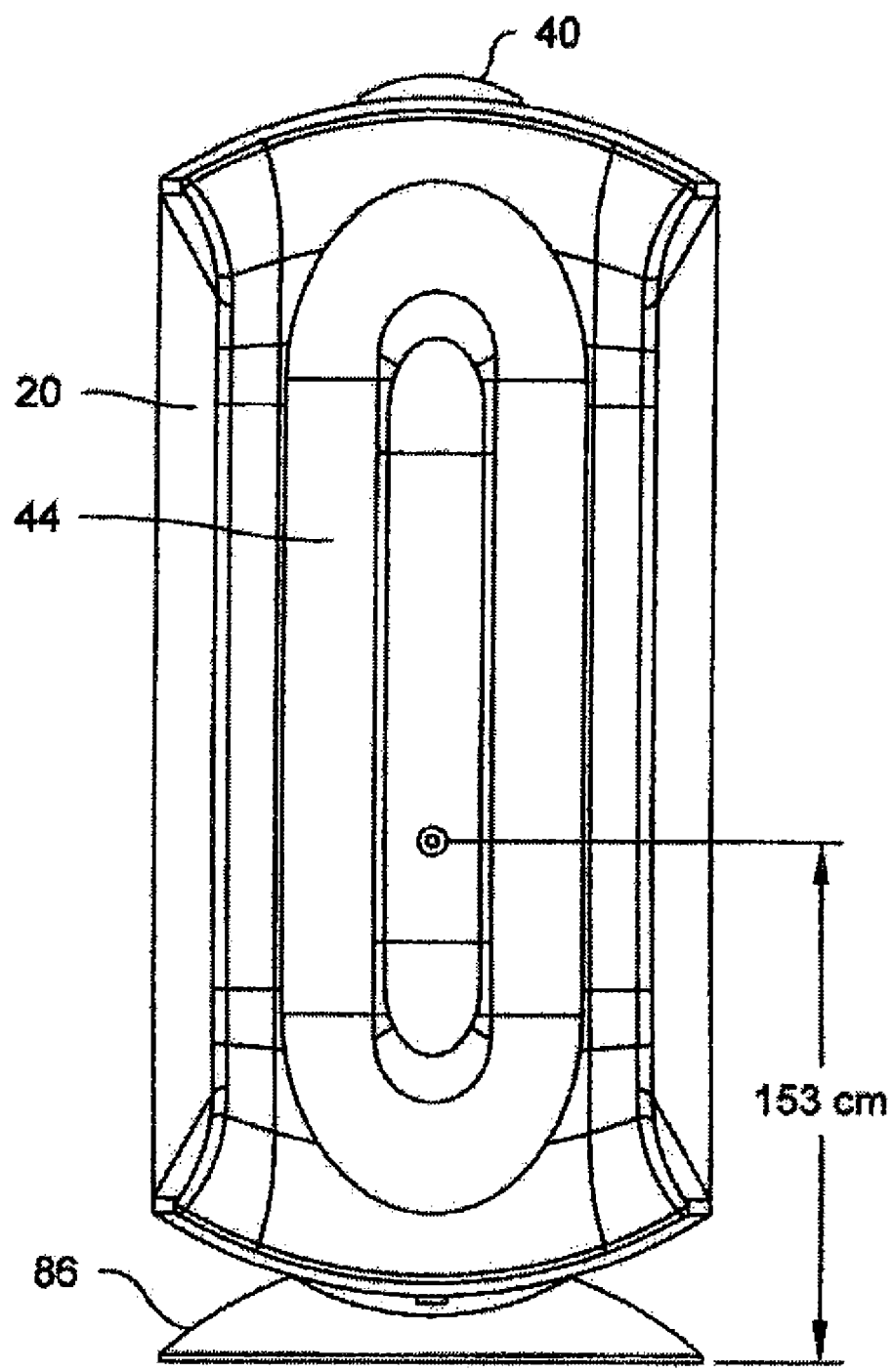
FIG. 6A is a front elevation view of the air purifier shown in FIG. 1 in the vertical operating orientation showing the vertical center of gravity.
Figure 6B:
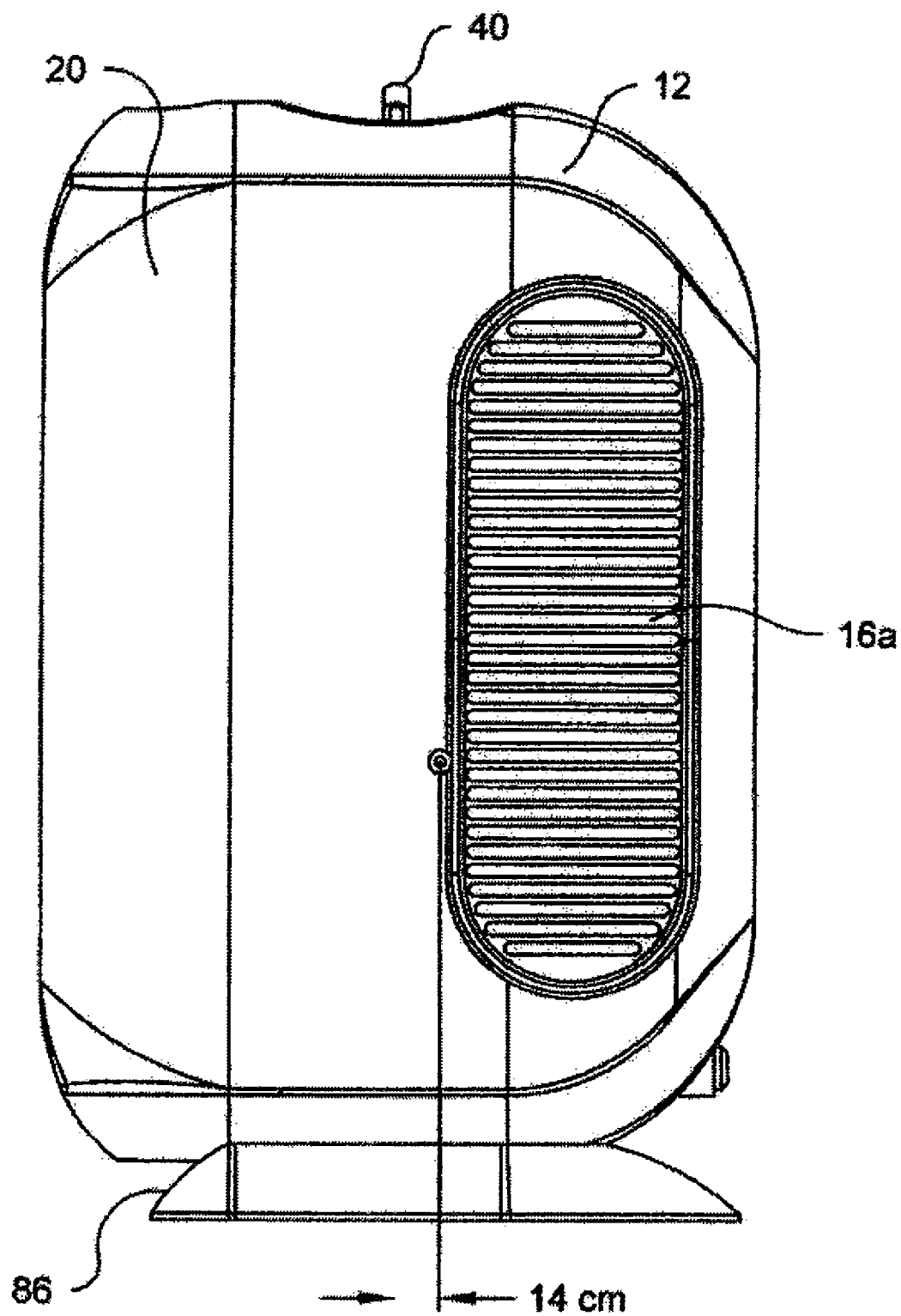
FIG. 6B is a right side elevation view of the air purifier shown in FIG. 1 in the vertical operating orientation showing the horizontal center of gravity.

In reference to FIGS. 1, 3, 5, 6A and 6B, the air purifier 10 includes a base 86 removably mounted to the housing 12 so as to support the bottom 12b of the housing 12. As mentioned above, the base 86 supports the weight of the air purifier 86 when the air purifier 10 is in the vertical operating orientation (FIG. 1). An upper surface of the base 86 is generally sized and shape to support and conform to the bottom 12b of the housing 12 (FIGS. 5 and 6a). As seen in FIG. 5, the bottom 12b of the housing 12 has a slot 60 therein sized and shaped to removably receive at least a portion of the base 86. The base 86 is preferably formed of a polymeric material. However, it is understood by those skilled in the art that the base 86 can be formed from a variety of high strength, light weight material, such as a metal alloy. When the air purifier 10 is in the horizontal operating orientation (FIG. 2), the base 86 can either remain attached to the housing 12 or be removed from the housing 12.

Figure 3:
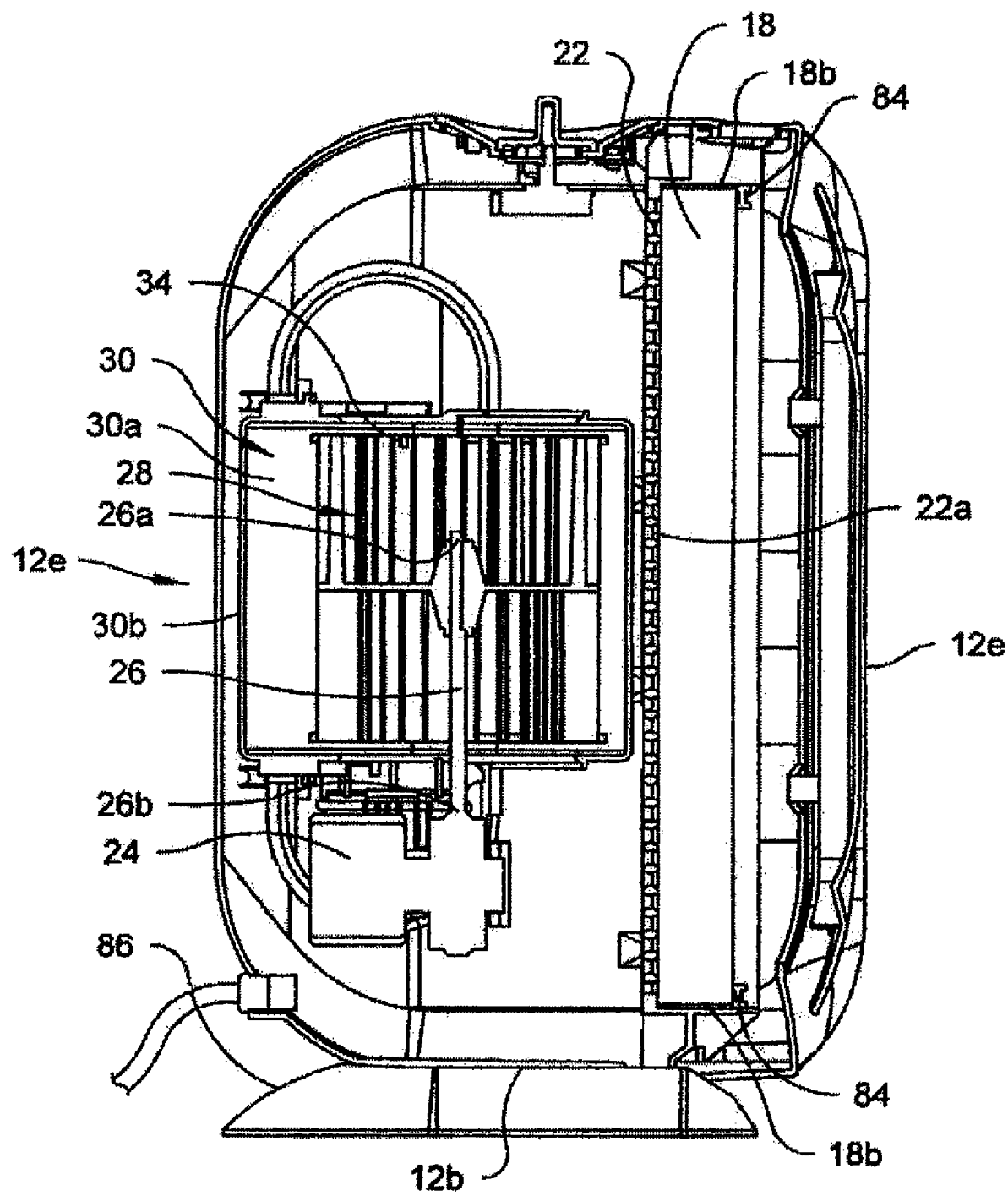
FIG. 3 is a left side cross-sectional elevation view of the air purifier shown in FIG. 1 in the vertical operating orientation.
Figure 4:
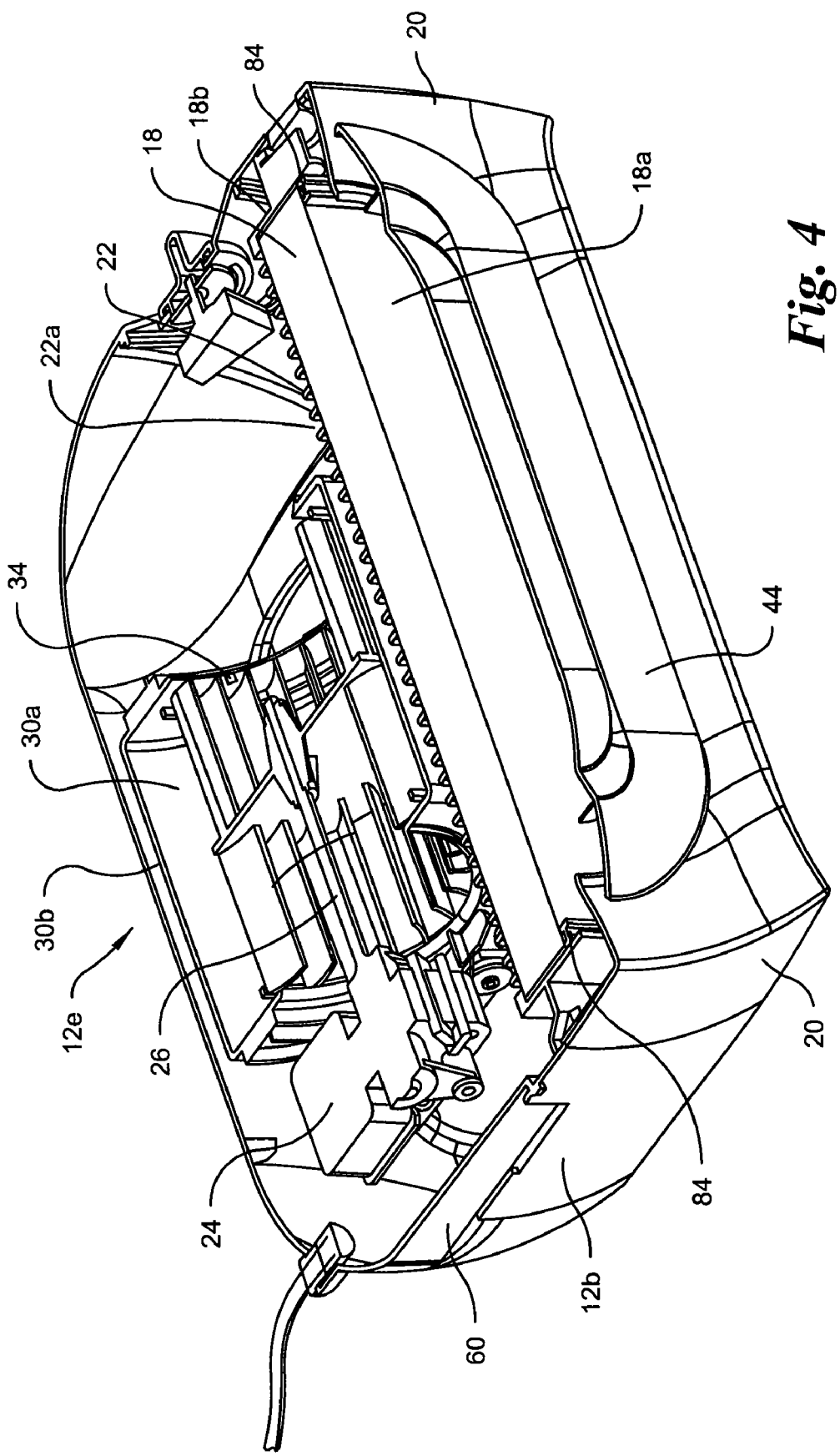
FIG. 4 is a left-side cross sectional perspective view of the air purifier shown in FIG. 1 in the horizontal operating orientation.

Referring to FIGS. 3-5, the air purifier 10 also includes an air filter 18 mounted within the housing 12 in the airflow path. The air filter 18 is attached to the housing 12 by two strips 84. The strips 84 can attach the air filter 18 to the housing 12 in a variety of ways, including magnetism, adhesion or Velcro. One strip 84 is located at an upper portion of the air filter 18 and a second strip 84 is located at a lower portion of the air filter 18. The strips 84 are preferably formed of molded polymeric material and are rectangular in shape to extend across the entire surface of the air filter 18. However, it is understood by those skilled in the art that the number, material and shape of the strips 84 can be modified without departing from the spirit and scope of the invention. For example, the strips 84 can be formed of any material, such as a metal, and there can be a plurality of three or more strips 84 that attach the sides of the air filter 18, instead of the top and bottom, to the housing 12.

In the preferred embodiment, the air filter 18 is comprised of a filter frame 18b that supports a pleated filter material 18a at its periphery. The air filter 18 preferably has a generally rectangular shape or configuration and is mounted within the airflow path in the housing 12 such that a large majority or all of the air that flows along the airflow path in the housing 12 flows through the filter material 18a for purification or removal of dust, particles or other contaminants from the air prior to flowing out of the housing 12 through the air outlet 16. The filter material 18a may be comprised of nearly any type or variety of filter material including but not limited to a fibrous filter material, a carbon filter or a high efficiency particulate absorbing/high efficiency particulate air (HEPA) filter material. In addition, the air filter 18 is not limited to being comprised of the filter material 18a mounted within the filter frame 18b and may be comprised of a loose piece of filter material that is mountable within the airflow path to permit air flow therethrough and capture particles, dust or other contaminants.

Referring to FIGS. 1, 2, 4 and 5, in the preferred embodiment, the air purifier 10 includes an arcuate-shaped cover 20 removably mounted to the housing 12 by a release button 80 preferably located at an upper front portion of the housing 12. Further, a filter box 22 is mounted to a front of the housing 12 proximate the air inlet 14. The cover 20 is generally sized and shaped to match the front of the housing 12. An upper portion of the cover 20 includes an aperture 82 to receive the release button 80 of the housing 12. The release button 80 is positioned in the aperture 82 when the air purifier 10 is in the assembled configuration. The release button 80 and aperture 82 of the housing 12 and cover 20, respectively, can be located in a variety of places on the housing 12 and cover 20 to allow the cover 20 to be removably mounted to the housing 12. It is generally well known to one having ordinary skill in the art that a user can depress the release button 80 to remove the cover 20 from the housing 12. The cover 20 is not limited to being removably mounted to the housing 12 by the release button and aperture 82. The cover 20 may be removably mounted to the housing 12 in nearly any manner including an interference fit, clamps, bolts or other similar fastening devices that permit the cover 20 to be removably mounted to the housing 12. In addition, the cover 20 is not limited to being removable from the housing 12 and may be fixed to or integral with the housing 12.

The filter box 22 preferably includes an airflow grate 22a that extends into and across the airflow path and permits airflow therethrough. The filter box 22, airflow grate 22a and arcuate-shaped cover 20 are preferably constructed of a generally rigid, molded polymeric material. The cover 20, filter box 22 and airflow grate 22a are not limited to being constructed of a generally rigid, polymeric material and may be constructed of nearly any rigid, structural material that is able to take on the general shape of the cover 20, filter box 22 and airflow grate 22a and perform the typical functions of these components. In the preferred embodiment, the filter box 22 and airflow grate 22a are integrally molded with the housing 12. However, it is understood that the filter box 22 and airflow grate 22a can be removably secured to the housing 12 without departing from the spirit and scope or the invention.

The preferred filter box 22 permits positioning of the air filter 18 therein and aids in the proper alignment of the air filter 18 within the housing 12 in the airflow path. In addition, the arcuate-shape of the cover 20 of the preferred air purifier 10 guides or funnels air from the room into the air inlet 14 and into the airflow path during use of the air purifier 10. Further, the airflow grate 22a aids in properly positioning the air filter 18 within the airflow path in the housing 12 and securing the air filter 18 in a preferred location in the airflow path. The air purifier 10 is not limited to inclusion of the single-piece cover 20, filter box 22 and airflow grate 22*a* and these components may be separately or alternately constructed or not included in the air purifier 10 without significantly impacting the operation of the air purifier 10. However, the cover 20 is preferred for guiding the flow of air into the air inlet 14 and the filter box 22 and airflow grate 22*a* are preferred for aiding in positioning of the air filter 18 in a preferred location in the airflow path and securing the air filter 18 within the housing 12 in a preferred location.

Referring to FIGS. 3 and 4, the air purifier 10 also includes a motor 24 located within the housing 12. The motor 24 includes a motor output shaft 26. In the preferred embodiment, the motor 24 is comprised of an electric motor and the motor output shaft 26 extends from a top end of the motor 24. The air purifier 10 is not limited to inclusion of an electric motor 24 and may include a battery operated motor or other drive mechanism that is able to provide power to draw air into the air inlet 14, through the airflow path and out of the air outlet 16 of the housing 12.

The motor 24 is located between a midpoint 12*e* and the bottom 12*b* of the housing 12 when the housing 12 is in the vertical operating orientation. The location of the motor 24 provides for a predetermined center of gravity of the air purifier 10 which is between the midpoint 12*e* and the bottom 12*b* of the housing 12 when the housing is in the vertical operating orientation to provide an inherent safety mechanism to the air purifier 10 and to reduce the likelihood that the air purifier 10 will tip over. In the preferred embodiment, the center of gravity of the air purifier 10 in the vertical operating orientation is generally located at a distance equivalent to about one third of the height of the air purifier 10 above the floor or countertop (FIG. 6A) and at about a midline of the air purifier 10 (FIG. 6B) when viewed from the side. However, it is understood by those skilled in the art that the location of the motor 24 can be modified to provide increased stability to the air purifier 10 in the vertical operating orientation without departing from the spirit and scope of the invention. For example, the motor 24 can be located closer to the bottom 12*b* of the housing 12 to provide a lower center of gravity to the air purifier 10.

A fan 28 is mounted to the motor shaft 26 for urging air into the air inlet 14, through the airflow path and out of the air outlet 16. The motor shaft 26 has first and second ends 26*a*, 26*b*. The fan 28 is secured to the first end 26*a* and motor 24 is operatively connected to the second end 26*b*. In the preferred embodiment, a channel 30 is mounted within an upper portion of the housing 12 in the airflow path. The fan 28 is secured to the motor shaft 26 within the channel 30. Accordingly, in the preferred embodiment, the motor 24 drives the motor shaft 26 which, in turn, drives the fan 28 to draw air into the air inlet 14 and expel air from the housing 12 through the air outlet 16. The fan 28 is preferably mounted within the channel 30 to improve the effectiveness of the fan 28 and the flow of air through the airflow path. In the preferred embodiment, the fan is comprised of a basket-like fan, which is described in U.S. Pat. No. 6,328,791, which is incorporated herein by reference. Basket-like fans are generally well known to those having ordinary skill in the art and will not be described in further detail.

In the preferred embodiment, the channel 30 includes an outlet channel 30*a*. The outlet channel 30*a* preferably includes a terminal edge 30*b* that is positioned proximate an inner surface of the housing 12 proximate the louvered vent 16*a* to direct air out of the air outlet 16. Preferably, the terminal edges 30*b* of the outlet channel 30*a* is in facing engagement with the inner surface of the housing 12 and in registry with the louvered vent 16*a* to channel or urge air directly out of the louvered vent 16*a*. The channel 30 is not limited to inclusion of the outlet channel 30*a* or to the terminal edge 30*b* being in facing engagement with the inner surface at a periphery of the louvered vent 16*a*. For example, the channel 30 may include an outlet that is spaced from the air outlet 16 or the channel 30 and may be constructed such that the channel 30 does not include the outlet channel 30*a*. However, it is preferred that the terminal edge 30*b* of outlet channel 30*a* is in facing engagement with the inner surface in registry with a peripheral edge of the louvered vent 16*a* to urge air directly out of the air outlet 16 from the housing 12 to improve airflow through the airflow path.

Referring to FIGS. 3 and 4, in the preferred embodiment, an ionizer needle 34 is positioned in the outlet channel 30. The ionizer needle 34 is preferably comprised of an electrically charged ionizer needle 34 that provides an electrical charge to particles that flow through the outlet channel 30*a*. The air purifier 10 is not limited to inclusion of the ionizer needle 34 or to inclusion of a single ionizer needle 34 positioned in the outlet channel 30*a*, as is shown in FIGS. 3 and 4. The air purifier 10 may be constructed without inclusion of the ionizer needle 34 or may include more than one ionizer needle (not shown) within the airflow path to charge particles that proceed along the airflow path. However, the ionizer needle 34 is preferably mounted to the outlet channel 30*a* to charge particles as they flow out of the louvered vent 16*a* such that the particles are attracted to an oppositely charged object (not shown) and generally do not remain suspended in the air or the room. The ionizer needle or ion emitter 34 is generally well known to those having ordinary skill in the art and is not described in greater detail.

Figure 7:
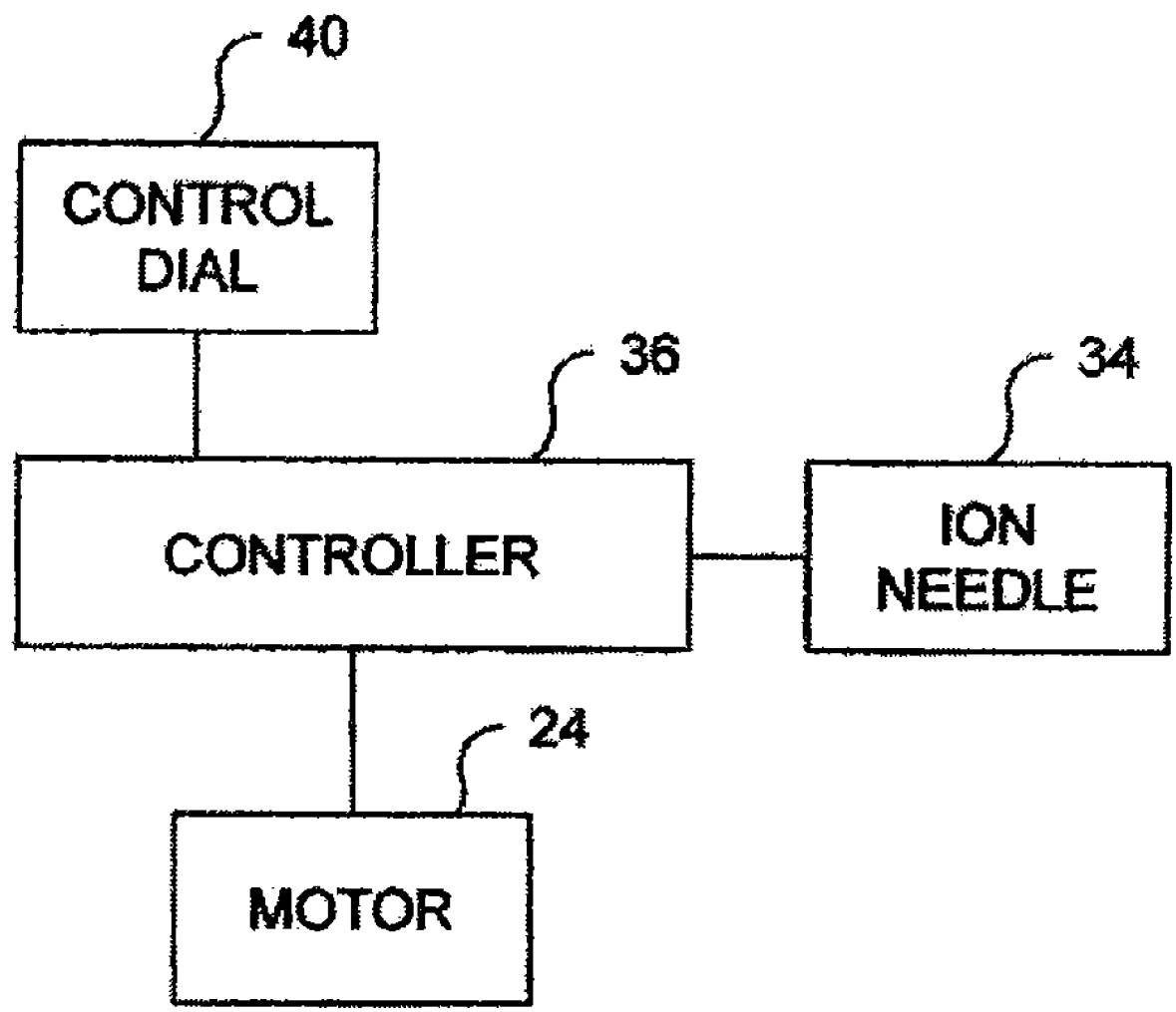
FIG. 7 is a schematic block diagram of a controller and related components of the air purifier shown in FIG. 1.

Referring to FIG. 7, in the preferred embodiment, a controller 36 located within the housing 12 is in communication with the motor 24. The controller 36 actuates the motor 24 to operate at one of a plurality of operating speeds. The air purifier 10 is not limited to inclusion of the controller 36 and may be constructed without the inclusion of either of this component without significantly impacting the overall operation of the air purifier 10. A control dial 40 is in communication with the controller 36 and is actuatable between low or whisper clean, medium and high or quick clean operating modes of the air purifier 10. As shown in FIG. 1, the control dial 40 is preferably secured to a top surface of the housing 12 of the air purifier 10 for ease of access by a user and relatively simple visual locating of the control dial 40. The control dial 40 is not limited to inclusion in the air purifier 10 or to mounting at the top surface of the housing 12. For example, the control dial 40 may be eliminated from the air purifier 10 without significantly impacting the operation of the air purifier 10 or may be adapted for other specific uses of the air purifier 10. However, the control dial 40 is preferably included for selection of various operating modes of the air purifier 10. In the preferred embodiment, the control dial 40 is actuable between the above-listed low, medium and high operating modes of the air purifier.

Referring to FIGS. 1 and 2, the air purifier 10 includes an air cowl 44 mounted to the cover 20. The air cowl 44 includes a peripheral edge 44*a* and the air inlet 14 is defined between the peripheral edge 44*a* and the cover 20. In the preferred embodiment, the air cowl 44 is constructed of a generally planar, rigid, polymeric panel and has a generally rectangular-shape. The air cowl 44 is not limited to constructions including a general arcuate-shape, being generally planar or to being constructed of a molded, polymeric material. The air cowl 44 may be constructed of nearly any generally rigid, structural material that is able to take on the general shape of the air cowl 44 and withstand the normal operating conditions of the air cowl 44. For example, the air cowl 44 may be constructed of a sheet metal, wooden or other like material that is able to take on the general shape of the air cowl 44 and withstand the normal operating conditions of the air cowl 44.

In the preferred embodiment, the air cowl 44 has an exposed face 46a and an internal face 46b. The air cowl 44 preferably includes a plurality of spacers 56 extending generally perpendicularly from the internal face 46b proximate the peripheral edge 44a. The spacers 56 are preferably integrally molded with the air cowl 44 and have a generally cylindrical-shape. The spacers 56 are not limited to extended generally perpendicularly from the internal face 46, to being integrally molded with the air cowl 44 or to having a generally cylindrical-shape. For example, the plurality of spacers 56 may be separately mounted rubber or polymeric blocks having a generally square or rectangular shape and mounted to the internal face 46 or may be mounted to the cover 20. However, the spacers 56 are preferably integrally molded, have a generally cylindrical-shape and extend generally perpendicularly from the internal face 46b to perform the function of the spacers 56 as will be described in greater detail below.

In a preferred assembled configuration, the spacers 56 locate the internal face 46b a first distance D1 from an upstream-face of the air filter 18. In the preferred embodiment, the first distance D1 is approximately 0.3 inches but is not so limited. The first distance D1 may comprise nearly any value that creates a space between the internal face 46b and the upstream face of the filter 18 such that air is able to flow between the internal face 46b and the air filter 18 and the air is able to flow into the entire upstream-face of the air filter 18. The spacers 56 preferably provide a consistent first distance D1 between the internal face 46b and the upstream-face of the air filter 18 such that the air purifier 10 consistently filters or purifies air from all sides of the air purifier 10. The internal face 46b is also not limited to being generally planar and may be sloped and/or curved to direct airflow from the inlet 14 toward the air filter 18 depending upon the configuration of the air purifier 10, as will be understood by one having ordinary skill in the art. For example, the internal face 46b may be curved to channel or funnel air toward a specific portion of the air filter 18 or the air purifier 10 may include multiple separate air filters (not shown) that are mounted in the housing 12 with air flow channeled into the separate air filters by channeling features constructed on the internal face 46b.

In reference to FIG. 5, a front surface 12f of the housing 12 includes at least one light source or light emitting device 50 to provide a glowing effect to the air inlet 14 when the air purifier 10 is turned on. The at least one light emitting device 50 is only directly visible to the user when the cover 20 is removed from the housing 12. In the preferred embodiment, four light emitting devices 50, which are comprised of light emitting diodes (LEDs), are located on the perimeter of the front surface 12f of the housing 12 at spaced apart locations. However, it is understood by those skilled in the art that the number, location and type of light emitting device 50 can be modified without departing from the spirit and scope of the invention. For example, the light emitting device 50 can be located at any location on the front surface 12f of the housing 12, such as the upper or lower sections, and the light emitting device 50 can be comprised of any light emitting structure, such as a neon tube or black-light.

In operation, the air cowl 44, cover 20 and filter box 22 are secured to the housing 12 to form an inlet portion of the housing 12 and the air filter 18 is positioned within the filter box 22 such that a lower edge of the air filter 18 rests upon a lower surface of the filter box 22. In this position, a downstream-face of the air filter 18 is positioned proximate or in facing engagement with the airflow grate 22a. The air filter 18 preferably is positioned in the filter box 22 such that a peripheral surface of the filter frame 18b is in facing engagement with the filter box 22 and nearly no air is able to flow between the filter frame 18b and the filter box 22. The air filter 18 may also be sized such that the filter frame 18b is force-fit into the filter box 22 such that the area between the air filter 18 and the filter box 22 is nearly air impermeable. The spacers 56 create the airflow space between the internal face 46b and the upstream-face of the air filter 18 and the first distance D1 between the internal face 46b and the upstream-face of the air filter 18 to promote airflow therein.

When the air purifier 10 is in the assembled configuration, the air purifier 10 is positioned within a room and the motor 24 is actuated to drive the fan 28 to urge air from the room into the air inlet 14, through the air filter 18, specifically through the filter material 18a, and out of louvered vent 16a. Specifically, the user manipulates the control dial 40 to place the air purifier 10 in one of the low or whisper clean, medium and high or quick clean modes. When one of the modes is selected and the motor 24 is actuated to begin rotation of the fan 28, air is drawn into the air inlet 14. Specifically, air is drawn into the air inlet 14, defined between the peripheral edge 44a of the air cowl 44 and the cover 20. Defining the air inlet 14 between the peripheral edge 44a and the cover 20 permits construction of the air cowl 44 with the relatively large, continuous exposed face 46a that may include a decorative pattern.

If the whisper clean or low mode is selected, the controller 36 actuates the motor 24 to continuously operate at a relatively low speed to rotate the motor shaft 26 and fan 28 at a relatively low speed. Such a relatively low speed rotation of the motor shaft 26 and fan 28 permits the air purifier 10 to operate at a relatively low noise level. As the fan 28 begins to rotate, air is drawn through the air inlet 14 between the peripheral edge 44a and the inlet cowl 20, into the space between the internal face 46b and the upstream-face of the air filter 18 created by the first distance D1, through the air filter 18 and into an area within the housing 12 proximate the channel 30. The air is then drawn into channel 30, flows past the basket-like fan 28, into the outlet channel 30a and out of the louvered vent 16a. In operation, the outlet air preferably flows past the ionizer needle 34, charging particles remaining in the initially filtered air with an electrical charge such that the particles are attracted to a surface or to each other and generally do not remain suspended within the air. In the medium and quick clean or high modes, the air purifier 10 operates in nearly an identical manner to the whisper clean or low mode with the motor 24 actuated by the controller 36 to continuously operate at a medium or high speed, respectively, and draw an a larger volume of air into the air purifier 10 when compared to operation in the low or whisper clean mode.

In the preferred operation of the air purifier 10, the at least one light emitting device 50 provides a glowing effect to the air inlet 14 and the ionizer needle 34 is constantly emitting a charge to particles and air in or proximate to the air outlet 16. The controller 36 is not limited to constantly powering the ionizer needle 34 and may selectively power or charge the ionizer needle 34 based upon the mode of operation selected by the user, as will be understood by one having ordinary skill in the art.

Referring to FIGS. 1-4, in the preferred embodiment, the airflow through the airflow channel of the air purifier 10 enters through the air inlet 14 between the peripheral edge 44a and cover 20, flows into the space between the upstream face of the air filter 18 and the internal face 46b of the air cowl 44, flows through the air filter 18 where particles, dust or other contaminants are captured in the filter material 18a, into the space in the housing 12 proximate the channel 30, into the channel 30, past the fan 28, through the outlet channel 30a and out of the louvered vent 16a. The air purifier 10 is not limited to the described airflow pattern and the airflow may alternately flow through the air purifier 10. For example, the air inlet 14 between the peripheral edge 44a and the cover 20 may be configured as an air outlet such that the exposed face 46a of the air cowl 44 is located at the outlet of the air purifier 10, as would be understood by one having ordinary skill in the art.

To replace or clean the air filter 18 of the air purifier 10, the cover 20 is removed from the housing 12 by depressing the release button 80. If the air filter 18 is fixed, force-fit or permanently secured in the filter box 22 or housing 12, a user may clean the upstream-face of the air filter 18 using a vacuum or other cleaning methods. If the air filter 18 is disposable and removable from the filter box 22 or housing 12, the user removes the strips 84 from the front of the air filter 18 and then removes the air filter 18 from the filter box 22 and inserts a replacement filter 18 into the filter box 22. The contaminated or dirty air filter 18 may be disposed of or may be cleaned for subsequent use. The cover 20 is then mounted back onto the housing 12 making sure that the release button 80 is secured within the aperture 82.

It will be appreciated by those skilled in the art that changes could be made to the embodiment described above without departing from the broad inventive concept thereof. It is understood, therefore, that this invention is not limited to the particular embodiment disclosed, but is intended to cover modifications within the spirit and scope of the present invention as defined by the appended claims.

We claim:

1. An air purifier for removing particles or contaminants from air, comprising:
   a housing including an air inlet, an air outlet and an air flow path therethrough, said housing having a top, a bottom and a plurality of sides;
   an air filter within said housing in said air flow path;
   a motor, including a motor shaft, within said housing;
   a fan on said motor shaft for urging air into said air inlet, through said air flow path and out of said air outlet;
   a cover removably mounted to said housing proximate to said air inlet; and
   a base removably mounted to said housing, an upper surface of the base being sized and shaped to conform to the bottom of the housing, the bottom of the housing having a slot therein sized and shaped to removably receive at least a portion of the base;
   wherein said air purifier is positionable in a vertical operating orientation when the weight of said housing is supported by said base and a horizontal operating orientation when the weight of said housing is supported by one of said sides of said housing.

2. The air purifier of claim 1, further comprising an air cowl mounted to said cover, wherein said air cowl has a generally planar exposed face and has a generally arcuate-shaped peripheral edge, said air cowl having an exposed face, an internal face and at least one spacer extending generally perpendicularly from said internal face.

3. The air purifier of claim 1, wherein said cover includes an arcuate-shaped air cowl, said air inlet being defined between a peripheral edge of said air cowl and said cover.

4. The air purifier of claim 1, wherein said housing includes an air cowl and a filter box, said filter box including an air flow grate, said air filter being secured in said filter box between said air cowl and said air flow grate.

5. The air purifier of claim 1, further comprising:
   a channel within said housing in said air flow path;
   said motor shaft including a first end and a second end, and said fan secured proximate to said first end of said motor shaft.

6. The air purifier of claim 5, further comprising:
   an ionizer positioned in said channel.

7. The air purifier of claim 5, further comprising:
   a control dial on said housing and being in communication with said motor.

8. An air purifier, positionable in a vertical operating orientation and a horizontal operating orientation, for removing particles or contaminants from air, comprising:
   a housing including an air inlet, an air outlet and an air flow path therethrough, said housing having a top, a bottom and a plurality of sides and having a height and a midpoint disposed midway along said height;
   a base removably mounted to said housing, an upper surface of the base being sized and shaped to conform to the bottom of the housing, the bottom of the housing having a slot therein sized and shaped to removably receive at least a portion of the base;
   a cover removably mounted to said housing;
   an air filter removably positioned within said housing in said air flow path;
   a motor, including a motor shaft, within said housing, said motor being located between said midpoint and a bottom of said housing when said housing is in said vertical operating orientation;
   a fan on said motor shaft for urging air into said air inlet, through said air flow path and out of said air outlet; and
   an air cowl mounted to said cover proximate to said air inlet.

9. The air purifier of claim 8, wherein the location of said motor provides for a predetermined center of gravity of said air purifier between said midpoint and said bottom of said housing when said housing is in said vertical operating orientation to reduce the likelihood that said air purifier will tip over.

10. The air purifier of claim 9, further comprising:
    at least one ionizer within said air flow path for charging particles that flow through said air flow path during operation of said air purifier.

11. An air purifier for removing particles or contaminants from air, comprising:
    a housing including an air inlet, an air outlet, and an air flow path therethrough, said housing having a top, a bottom, a plurality of sides and at least two spaced-apart light emitting devices, each light emitting device being located on an opposite side of a perimeter of a front surface of the housing;
    an air filter within said housing in said air flow path; and
    a cover removably mounted to said housing proximate to said air inlet, said at least two light emitting devices being located between said front surface of said housing and an inner surface of said cover, said at least two light emitting devices being only directly visible to a user when said cover is removed from said housing;
    wherein said at least two light emitting devices illuminate said air inlet when said air purifier is turned on to provide a glowing effect to said air inlet.

12. The air purifier of claim 11, further comprising an air cowl mounted to said cover, said air cowl having an exposed face, an internal face and at least one spacer extending generally perpendicularly from said internal face, wherein said air inlet being defined between a peripheral edge of said air cowl and said cover.

13. The air purifier of claim 12, further comprising a base removably mounted to said housing, wherein said air purifier is positionable in one of a vertical operating orientation when the weight of said housing is supported by said base and a horizontal operating orientation when the weight of said housing is supported by one of said sides of said housing.

14. The air purifier of claim 11, further comprising a motor, including a motor shaft, within said housing and a fan on said motor shaft for urging air into said air inlet, through said air flow path and out of said air outlet.

15. The air purifier of claim 11, further comprising a channel within said housing and an ionizer positioned in said channel; said ionizer charges particles that flow through said air flow path during operation of said air purifier.

16. The air purifier of claim 11, wherein said at least two light emitting devices are each comprised of a light emitting diode (LED).

* * * * *